Aug. 24, 1965 A. O. HARRIS 3,202,044
PICTURE PROJECTING SYSTEM WITH REMOTE PORTABLE CONTROL
Filed Jan. 31, 1962 2 Sheets-Sheet 1
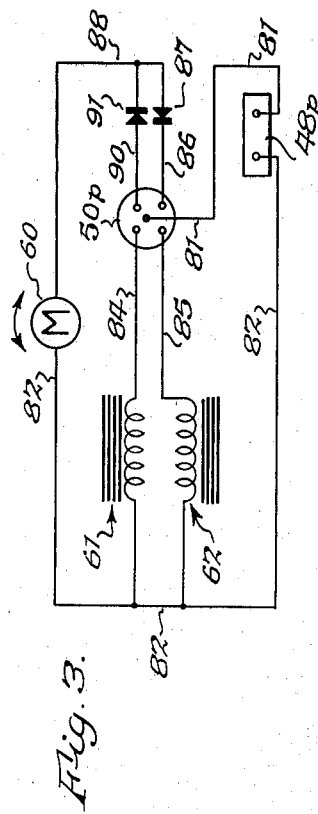
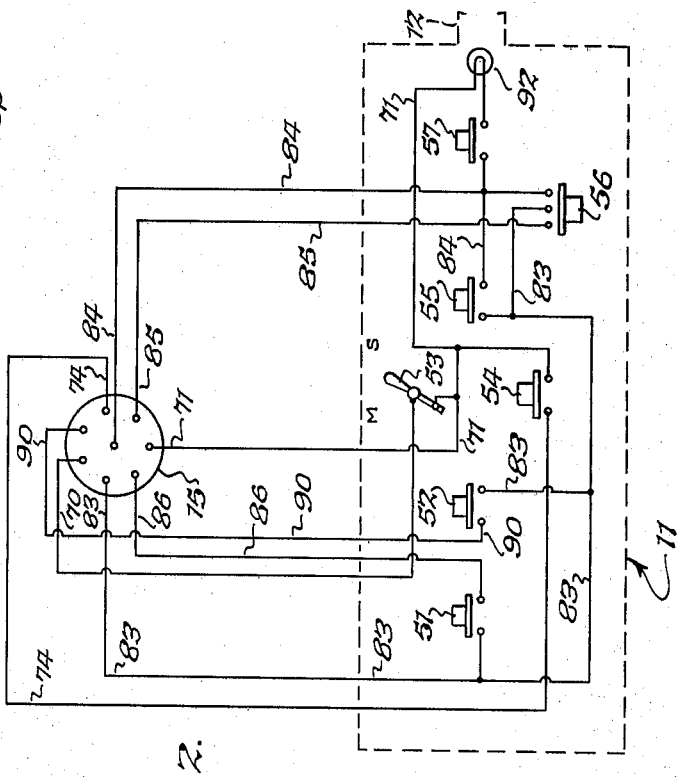
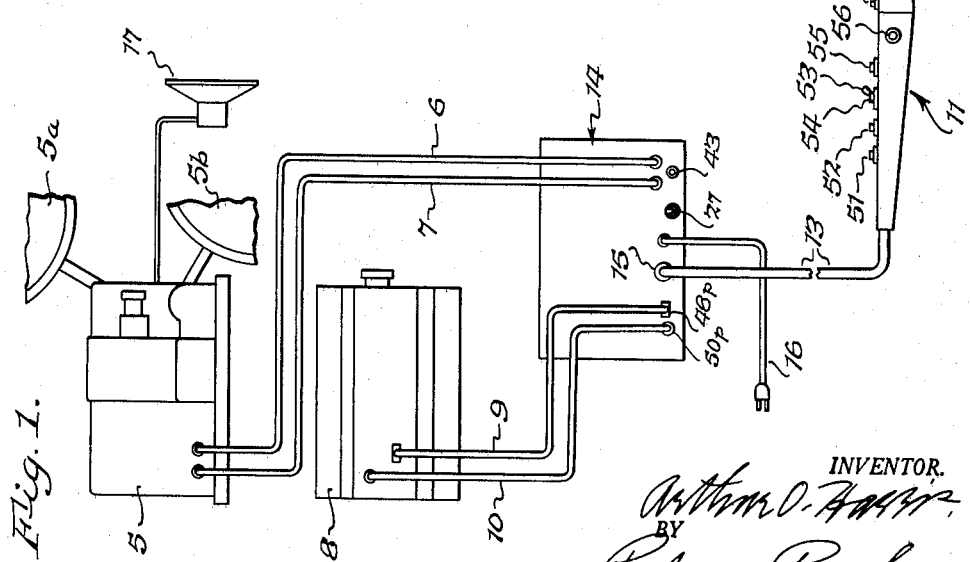
INVENTOR.
Arthur O. Harris
BY
Parker & Buchman
ATTORNEYS.

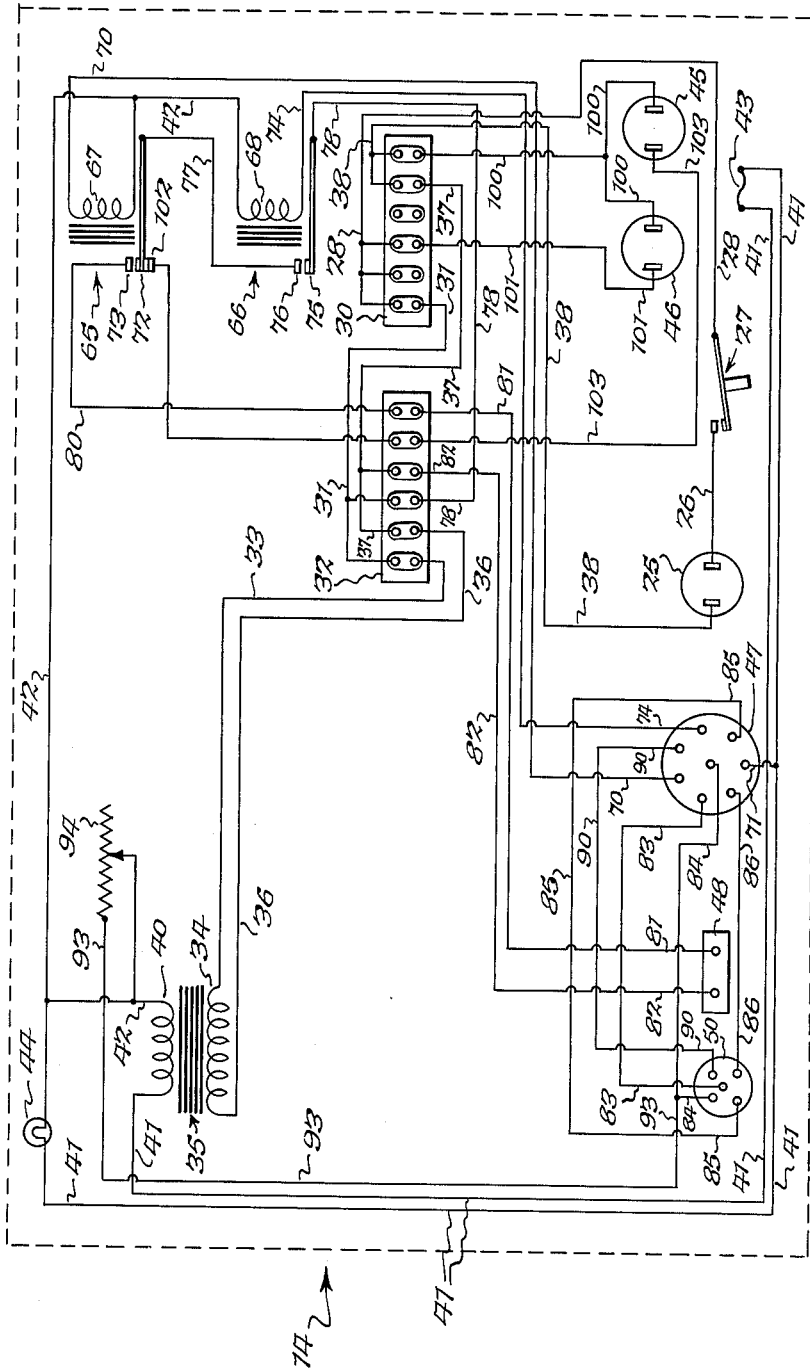

United States Patent Office 3,202,044
Patented Aug. 24, 1965

3,202,044
PICTURE PROJECTING SYSTEM WITH
REMOTE PORTABLE CONTROL
Arthur O. Harris, 207 Delaware Ave., Buffalo, N.Y.
Filed Jan. 31, 1962, Ser. No. 170,128
3 Claims. (Cl. 88—24)

This invention relates to a system whereby a moving picture machine and a slide projector may be used intermittently for projecting related moving and still pictures on a single screen.

It frequently happens in projecting a moving picture on a screen, certain parts of the subject matter can be made clearer by projecting a still picture on the screen from slides, with time allowance for discussion or explanation. Similarly, when showing still pictures from slides, it may be desirable to interpose some moving pictures to illustrate an action or process.

Experience has shown that motion pictures are outstanding for vividly portraying situations, actions and illustrating problem solutions. But film presentations usually progress too rapidly to impart principles, new methods, complex or detailed information which the viewers are required to grasp clearly for use on their own initiative in their own activities. Serious professional or vocational instruction requires deliberate progressive disclosure in pace with the learner's speed of comprehension. This can best be conveyed with slides. The easiest, quickest, most impressive way to instruct practicably is to show the situations or problems to be met and the procedures for solving them with sound motion picture films—with slides injected throughout to emphasize the principle involved and to guide group discussion and individual practice or notation at each step.

One of the objects of this invention is to provide a remote control whereby a motion picture projector and a slide projector are controlled by a lecturer or conference leader stationed at a distance from the projectors, whereby one type of projector can be interrupted at any time, according to the judgment of the lecturer or leader, and the other projector put into action immediately so that there will be practically no apparent delay or diverting intermission in the subject matter being projected on the screen.

It is also an object of this invention to provide an improved system and circuit by means of which the moving picture projector and the slide projector can both be remotely controlled by means of a suitable switching device which may be held by the speaker who can control both projectors to operate intermittently, thus eliminating the need for an additional person to operate the projectors, with disturbing communications and delays in projection.

It is another object of this invention to provide apparatus of this type with a remote controller with switches for reversing the order in which the slides are shown; also to provide the controller with means for projecting a beam of light on the picture to act as a pointer.

Another object is to provide the remote controller with means for adjusting the lens relatively to the light source for focusing a picture.

The accompanying drawings illustrate by way of example one embodiment of this invention. In these drawings:

FIG. 1 is a diagrammatic view showing the various units of the apparatus and the connections between them.

FIG. 2 is a diagram of electrical components and their connections in the hand controller unit used in the system.

FIG. 3 is a diagram of electrical components and their connections of a typical slide unit of the apparatus.

FIG. 4 is a diagram of electrical components and their connections in the operating control box of the system.

In these drawings, 5 represents a moving picture projector which may be of any suitable or desired type and having the usual reels 5a and 5b for the film. 8 represents diagrammatically a slide projector of the type which may be operated by remote control to position the slides automatically in correct relation to the light source and lens for projecting them on a screen. The two projectors may be positioned on a table or support independently of each other and are connected with each other only by electrical conductors. The system is operated by means of a controller 11 which contains a number of switches or circuit closing devices to be held in the hand of a speaker or lecturer. This hand controller is connected by a cable 13 containing a plurality of conductors to a control box or support 14 by means of a connecting plug 15. Current to operate the apparatus may be supplied through the usual power cord and plug 16 connected to the control unit 14. A control cable 6 connects the projector to the control unit 14 as does another cable 7 connecting with the sound track amplifier built into the projector 5. The usual loud speaker 17 is also connected to this projector and amplifier for sound reproduction from the film strip, if desired. Cables 9 and 10 also connect the slide projector 8 to the control unit 14 to coordinate this device into the system.

It will thus be seen that the projector and amplifier 5 and the slide projector 8 are both powered and controlled by the control unit or mechanism 14 which in turn is under the control of the hand controller 11, which also has incorporated with it a light pointer 12.

As shown in the diagram of FIG. 4, a 110-volt alternating current receptacle 25 receives a plug on the end of the power cord 16 to supply current to the control unit or mechanism 14. One side of the line 26 goes to an off-switch 27 and then through line 28 to connectors on a terminal strip 30, and from this strip through a line 31 to another terminal strip 32. From here the line 33 goes to the primary winding 34 of a step down transformer 35 and thence through line 36 to terminal strips 32, line 37 to terminal strip 30, to line 38 and then to the other side of the line of the receptacle 25. Thus when the switch 27 is closed the transformer 35 is energized to supply a lower voltage from its secondary 40 to the low voltage lines 41 and 42. The line 41 has a fuse 43 in it, and an indicator lamp 44 and line 42 complete this circuit.

Other receptacles are provided on the chassis of the control unit for the various cables for connection to the other units of the system, such as receptacles 45 for the projection cable 6, receptacle 46 for the amplifier cable 7, receptacle 47 for the hand controller cable 13, receptacle 48 for the slide projector cable 9 and receptacle 50 for the slide projector control cable 10.

As will be seen in FIG. 2, the hand controller 11 comprises the various control switches and a light-pointer 12. On its cable end the hand controller 11 has a pair of switches 51 and 52 for adjustment of focus of the slide projector 8. Switch 51 moves the slide lens inwardly while the switch 52 moves it outwardly. Next a selector switch 53 may be thrown to an "S" slide position or an "M" movie position to select which projector will be used. A push switch 54 when depressed will activate either of the projectors, depending upon the position of the selector switch 53. This switch 54 is of the type which when pushed and released will stay in that position until it is pushed and released, whereupon it will then be in its other position. Another pair of push switches 55 and 56 are provided to change the slides in the slide projector 8, switch 55 being used to advance the slides and switch 56 being used to retrace or reverse the movement of the slides.

Another push switch 57 is provided to illuminate the light pointer 12. All of the wires comprising the circuitry of this unit are enclosed in the cable 13 and electrically connected to the control unit 14 by the plug 15 inserted in the receptacle 47.

In FIG. 3 is shown the typical circuitry used in a slide projector of the type used with this system having a plug 48p which is plugged into the receptacle 48 of the control unit 14 through which it receives current for activation of a reversible focus drive motor 60, a forward slide acivator 61 and a retrace activator 62. When it is desired to start the program, the switch 54 is pushed to its "on" position. When it is desired to show slides the selector switch 53 is thrown to the "S" position, and then to advance a slide into position the push switch 55 is depressed.

As shown in FIG. 4, a double contact slide relay 65 and a single contact slide relay 66 are provided. Current from the transformer low voltage winding 40 is supplied to the coils 67 and 68 of the relays 65 and 66 through the line 42. A line 70 goes to contacts of the receptacle 47 and its plug 15, and as seen in FIG. 2, then goes to the selector switch 53 which is now in Slide position and connected to line 71 going to plug 15, receptacle 47, where in line 71 connects with line 41 to the other side of the transformer winding 40, thus energizing the coil 67 of relay 65 and connecting its movable contact 72 to the upper contact 73. When the holding type push switch 54 in FIG. 2 is closed the coil 68 of relay 66 is energized by current from the line 42 to line 74 to contacts of receptacle 47, plug 15, FIG. 1 and thence to line 71 through the closed contacts of the switch 54; the line 71 through plug 15 and receptacle 47 connecting to line 41 of the other side of transformer winding 40, thus supplying current to also energize the coil 68 of relay 66 and closing the movable contact 75 with the contact 76 which is connected to the aforementioned movable contact 72 of relay 65 by line 77. Line voltage will now be supplied to the movable contact 72 from the line 31 at terminal strip 32 to a line 78, contact 75, contact 76 and line 77. Contact 72 now closed with contact 73 supplies current to line 80, terminal strip 32, line 81 to the receptacle 48, plug 48p and line 81, shown in FIG. 3. Line 82 at plug 48p going back through receptacle 48, FIG. 4, to terminal strip 32 connecting to the other side of the line 37 thus supplying current to the slide projector to illuminate its projection lamp, not shown. Current in the lines 81 and 82, FIG. 3, is now available to motivate the slide projectors other electrical components as will be explained. The condition now is such that a slide may be advanced into the slide projector by depressing switch button 55.

In FIG. 2, when switch 55 is closed lines 83 and 84 are connected and going back through plug 15, receptacle 47, FIG. 4, the lines 83 and 84 go to the receptacle 50 and then to plug 50p, FIG. 3, where 84 connects to the forward slide actuator 61, and 83 connects to one side of the current supply line 81. Actuator 61 connects to the other side of the line 82 and is thus energized and moves a slide into position. When advance button switch 55 is released, the slide will stay in position and show on the screen. If it is pushed again the next succeeding slide will be brought into position. To retrace or backup slides, the push switch 56 is depressed. It will be noted that switch 56 has three contacts, two of which each connect to the lines 83 and 84 and therefore it can be assumed that when these lines 83 and 84 are connected together, as has just been explained, in regard to push switch 55, the same action will occur, i.e., energization of the actuator 61 but in addition the actuator 62 will be energized, as will now be explained. The line 85, FIG. 2 is also connected to line 84 when 56 is closed and going back to plug 15, FIG. 4, receptacle 47, lines 84 and 85 to receptacle 50, plug 50p, FIG. 3, line 85 connects the retrace activator 62 to one side of the line 81, the other side of activator 62 being connected to the other side of the line 82, thus energizing the retract activator 62 with the forward activator 61.

This results in a slide being retraced or backed up. If it is desired to retrace back more than one slide the switch button 56 is depressed the required number of times.

To adjust the slide projector lens in or out for focus, the switch buttons 51, 52 are provided. As in FIG. 2, the in switch 51 when closed connects the lines 83 and 86, and going back through plug 15, receptacle 47, FIG. 4, lines 83 and 86 then to receptacle 50, plug 50p, FIG. 3, line 83 connecting to one side of the line 81, while 86 connects to half-wave rectifier 87, line 88, reversible focus motor 60 to the other side of the line 82, thus energizing focus motor 60 to rotate in a direction to bring the lens in. For outward movement of the lens, push switch 52 is closed connecting the lines 83 and 90, back to the plug 15, receptacle 47, FIG. 4, lines 83 and 90 going to receptacle 50, plug 50p, FIG. 3, the line 83 connecting to one side of the line 81 while the line 90 connects to the half-wave rectifier 91 having polarity the reverse of rectifier 87, line 88, motor 60 and then to the other side of the line 82, thus energizing the reversible focus motor and making it rotate in a direction to bring the lens out.

To illuminate the pointer-light push switch 57 is depressed, this connecting the line 84 with the lamp 92, and line 71 going back to the plug 15, receptacle 47, FIG. 4, line 71 to line 41 back through fuse 43, line 41 to one side of low voltage winding 40 of the transformer 35, while line 84 connects with the line 93, resistor 94, line 95 back to the other side 42 of the transformer winding 40 completing the circuit. The resistor 94 may be variable to adjust the voltage of the lamp 92 to vary the intensity of the pointer light 12.

The sound amplifier circuit is energized continuously as soon as switch 27 is closed so that warm up is not required when it is called into use for the sound track of the movie projector. The line 38 through terminal strip 30 supplied current to one terminal of each of the projector and amplifier receptacles 45 and 46 through a line 100. The other side of the line 28 connects to the other terminal of the amplifier receptacle through a line 101.

The moving picture projector is supplied with current when the switch 53 is in its "M" or moving projector position, this deenergizing relay coil 67 of the relay 65 leaving its movable contact 72 closed with the lower contact 102. Therefore when switch 54, FIG. 2, is closed, the lines 71 and 74 are connected together, back through plug 15, receptacle 47, line 71 to line 41 through fuse 43, line 41 to one side of transformer winding 40, while line 74 goes to relay winding 68 of relay 66 to line 42 to the other side of the transformer winding 40, thus energizing it to connect the line 31 through line 78, movable contact 75, contact 76, line 77, movable contact 72, line 102, terminal strip 32 and thence line 103 to the other terminal of the projector receptacle 45, thus furnishing this projector with current to set it into operation.

The focal adjustment is obtained by rotating one section of point 12, which allows one to be from 6 feet to 40 feet from the screen and obtain a sharp light that will be effective in a semilighted room.

By means of the system described, the user of the system may stand near the screen remote from the projector apparatus. No operator for the projection apparatus is required since the speaker or instructor controls both the moving picture apparatus and the slide projector. This not only eiliminates the need for an operator for the projection apparatus, but also makes the operation much smoother since when either projection apparatus is stopped the other goes into operation immediately so that there is no waiting or delay between the still picture and the moving picture.

The leader may start and stop both projectors, switch from slides to film or film to slides, advance and reverse the slides, focus the lens of a slide projector having remote control focusing feature and also point out details on the screen, all with one small, inconspicuous, hand-held controller.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A projection system for use with a moving picture projector and a slide projector having mechanism for automatically positioning a slide into operative relation to a light source and a lens, said system including a remote portable controller to be held by a user of the system and including a plurality of switches mounted thereon for controlling the operation of said projectors, a selector switch on said controller movable into two positions, said switch in one position connecting with a circuit leading to said slide projector and in the other position connecting with a circuit including said moving picture projector, a push switch also on said controller and cooperating with said selector switch to actuate either of said circuits with which said selector switch is connected, and electrically actuated mechanisms in fixed relation to said projectors and connected electrically with said switches.

2. A projection system according to claim 1 and including a relay actuated by said selector switch and having terminals which when in contact constitute a part of a circuit leading to said slide projector lamp.

3. A projection system according to claim 2 and including a pair of switches on said controller and cooperating with said selector switch and said push switch, and circuits controlled by said pair of switches, one of which actuates mechanism for advancing a slide and the other of which actuates movement of a slide in the reverse direction.

References Cited by the Examiner

UNITED STATES PATENTS

| | | | |
|---|---|---|---|
| 1,394,797 | 10/21 | Smith | 84—24 |
| 2,717,530 | 9/55 | Morphis et al. | 88—24 |
| 2,986,968 | 6/61 | Kropp et al. | 88—24 |
| 3,023,669 | 3/62 | Hall | 88—24 |
| 3,040,622 | 6/61 | Reddle et al. | 88—24 |
| 3,078,763 | 2/63 | McCammon | 88—16 X |

NORTON ANSHER, *Primary Examiner.*

EMIL G. ANDERSON, *Examiner.*